Patented Oct. 24, 1933

1,931,575

UNITED STATES PATENT OFFICE 1,931,575

METHOD OF MANUFACTURING CELLULOSE

Joaquin Julio de la Roza, Sr., Tuinucu, Cuba

No Drawing. Application October 10, 1929
Serial No. 398,677

6 Claims. (Cl. 92—11)

This invention relates to a method of manufacturing cellulose, and has for an object to provide for the production of soft, strong, fibrous material of very high alpha content, low ash content and exceptional quality, adapted for use in various manufactures, the said material being produced from vegetable substances and more particularly from annual plants, such as the canes, corn stalks, straws and grasses, and still more particularly from sugar cane fiber.

Another object consists in providing such a method whereby a fresh vegetable material, newly cut or harvested, may be given a first treatment, immediately thereafter stored, and then given two or more subsequent treatments leading to the desired product and avoiding deterioration or injury to the material.

Another object consists in providing such a method whereby such a vegetable material may be given a first treatment of an acid nature at substantially atmospheric pressure and temperature, then stored, then given another treatment of an acid nature at medium to high density and at temperature below 110° C., (preferably below 100° C.), then given one or more alkaline treatments sufficient to pulp the material; the alkaline procedure being conducted either in one treatment at a temperature substantially above 100° C. or in two treatments, the first at approximately 100° C. and the second above 100° C.

Another object consists in providing such a method whereby the impregnation of the material with the treating chemical is better accomplished, so that the uniformity and efficiency of chemical action is promoted and a more complete charging of the treating vessels as well as economy of heating medium is attained.

Another object consists in providing such a method whereby treatments preliminary to the final pulping treatment affect the material so as to facilitate the subsequent recovery of chemicals employed and lower the non-cellulose constituents of the finished product.

Another object consists in providing certain improvements in the method whereby advantageous results are attained.

This method is particularly applicable to the manufacture of cellulose from sugar cane fiber, largely because that is an annual plant and the conditions attending sugar producion require a large portion of the fibrous material to be stored after it has been freshly cut from the growing state and before it can be fully processed and manufactured into cellulose; therefore I shall, by way of setting forth the practical application of my invention, describe it in connection with the production of cellulose from sugar cane fiber.

It is my blief that I have devised a method of producing a very pure cellulose, which is extraordinarily high in alpha content as well as in other distinctive characteristics of the best grade of this product; which method is commercially economical and practicable and does not impair the native strength of the fibrous element of the vegetable substances, but obviates difficulties and disadvantages which have been prevalent in connection with many prior methods, especially in respect to the treatment of annual plant fibers and, more especially, in respect to the treatment of sugar cane fibers. While the cellulose product of this method may be used for various manufactures, owing to its exceptional purity, strength and light color, it is particularly well adapted for the manufacture of the finest grades of paper and paper products, explosives, artificial silk, photographic films, pyroxylin products, cotton substitutes, absorbents, and analogous products of comparable grades.

In connection with this particular application of my method, it may be noted that the manufacture of sugar from cane is commonly accompanied by a treatment for the separation of the sugar juices from the fibrous part of the cane as, for instance, by crushing between rollers or treatment in diffusers, and that this industry thus supplies a very large amount of fibrous material which is commonly very inefficiently employed, if used at all. My method is thus adapted to the attainment of the economic industrial achievement which resides in the utilization of this large amount of fibrous material in a commercially advantageous and highly remunerative manner.

Generally speaking, my method includes a first treatment with an acid solution for a considerable period of time at substantially atmospheric pressure and temperature; a second treatment at medium to high density with an acid solution conducted for a comparatively short period at below 110° C.; and either a third treatment at medium density with an alkaline solution of comparatively low concentration conducted for a comparatively short period at substantially atmospheric pressure and at temperature below 100° C.; followed by a fourth treatment at high density with an alkaline solution for a comparatively short period at elevated pressure and temperature; or a third and final treatment at medium density with an alkaline solution of medium concentration for a comparatively short period at elevated temperature and pressure.

The acid treatments are calculated to obviate various fungi and other growths that prey upon the encrusting substances associated with the fiber, as well as partially to remove, or transform so as to nullify their injurious effects, the sucrose, invert and other sugars, pentosans, and similar carbo-hydrates, together with coloring and mineral matters, etc. The first acid treatment not only renders the material suitable for storage without danger of deterioration or spontaneous injury, but it, together with the second acid treatment, partially or totally removes or nullifies these seriously objectionable substances which would not be satisfactorily removed by the alkaline treatments alone, and furthermore prepares the material for satisfactory action by the subsequent treatments.

I find it desirable, between the acid and alkaline treatments, to wash the material (several times if practicable) preferably with hot water, although warm or cold water may be used with satisfactory results. This washing may be effectively carried out by supplying water to the fiber and then straining and squeezing off the liquid by rollers or some other approved means. However, it may be conducted in any well known or approved manner as, for instance, by repeatedly immersing the fiber in water, draining, and then squeezing off surplus liquid. The washing step is calculated to remove quantities of those substances which are in condition for solution or separation by the water at that stage of the method.

The alkaline procedure, whether it be accomplished in one treatment or two, is designed to render soluble various coloring and mineral matters, as well as other substances, which have not been dissolved or removed by the preceding acid treatment, and it serves to pulp the material and adapt it for the final customary steps in the manufacture of cellulose, leading to the product with minimum loss of strength, maximum yield, light color, low ash, and high purity.

In following the preferred manner of carrying out my invention, the sugar cane fiber obtained from the crushing rollers or diffusers, which should be as free as possible from sugar, is weighed and thereafter conveyed by a belt, or other suitable contrivance, to apparatus, such as shredding and screening devices, for the purpose of tearing the fiber bundles apart and separating the dust-like or short and fibrous material, commonly known as pith, from the longer and stronger fibrous material forming the exterior portions of the cane. The longer and stronger fibers are then treated preferably with a dilute solution of acid and water, which may contain, for instance, from two to six pounds of sulphur dioxide for each one hundred pounds of bone dry fiber treated. This treatment of the material may be conveniently accomplished by thoroughly spraying the solution from beneath the material as it is being carried from the shredding and screening devices to storage, care being taken to avoid too fine a spray which might tend to form sulphuric acid or to cause loss of too much sulphur dioxide to the air. If the storage is under such conditions as to allow any substantial evaporation or loss of solution, it is advisable occasionally to add to the material more of the solution of sulphur dioxide in water, because the storage may be, and frequently is, for a period of several months.

Another way of accomplishing this treatment is to entirely immerse the material in the sulphurous acid solution or solution of sulphur dioxide and water contained in suitable vats or the like protected against the action of the acid, and to permit the material thus to remain during the period of storage or treatment. Or the material may be sprayed and then immersed in the solution.

It will be understood that this treatment might be carried out in other ways and it should be noted that, in any case, I prefer to conduct this treatment at substantially atmospheric pressure and temperature. If conditions should require, suitable temperature controlling apparatus may be employed to maintain the temperature at substantially the normal atmospheric temperature of sugar cane growing localities but, ordinarily, in the tropics this will not be necessary. It should further be noted that the object of this sulphurous acid treatment is not to pulp the material, but is rather to lead to the protection of the fibrous cellulosic material while in storage and to the separation of certain substances as hereinabove indicated.

The period during which the material remains in storage subject to this acid treatment may, of course, vary; but usually it will be a matter of several months, or from crop to crop. If the material has been immersed in the acid solution, it may suitably be removed therefrom for the following step by bucket cranes or the like having those parts designed to enter the solution protected against the action of the acid.

The second acid treatment is preferably performed by heating the fibrous material in a closed vessel with a solution of sulphur dioxide in water and containing, for instance, about twelve to twenty-five or thirty pounds of sulphur dioxide for each one hundred pounds of bone dry fiber in the charge, to a temperature not to exceed 110° C. I have obtained good results at about 98° C. Although, at this temperature of 98° C., the solution will not be boiling, the formation of sulphur dioxide gas calls for the use of a closed vessel. While a standard sulphite digester designed for much lower pressure than customary may be used, I prefer a vessel specially designed for the purpose, such as that described in my U. S. patent application, Serial No. 414,610, filed December 16, 1929.

The material is introduced into the vessel for this acid treatment preferably at high density, that is, fifty or more percent of the total weight may be dry fiber. The acid solution is then added and it is immediately heated, as by adding steam, or with steam coils, until a temperature of not more than 110° C. is reached in about one hour. A temperature of about 98° C. is preferred, but a temperature of 90° C. also gives good results although requiring more time. The charge is kept at this temperature for a period of time, depending on the quality of product desired, but preferably three or more hours. Naturally a longer time will have a more complete effect, but this will tend to reduce the capacity of the plant, and, if continued too long, may injure the fiber, so that the time should be proportioned to the quality of product desired. A few minutes give a good quality of cellulose for paper, whereas, for the production of high alpha cellulose, the full time of three or more hours is required. Such treatment with acid solution is very important in that it eliminates certain very objectionable substances, such as iron, which would not be removed by the subsequent alkaline steps, and also partially removes or transforms other substances so that they may be readily removed by the subsequent treatments.

At the end of the selected period, the gas is first released to be recovered in the usual manner and the material is washed with water and removed from the vessel for squeezing and washing which may be conducted in any suitable apparatus; further recovery of gas being obtained from the various acid liquors. The surplus liquid is eliminated by pressure or the like, leaving the material comparatively free from acid and concentrated to from fifteen to fifty percent of dry fiber depending on the pressure applied. Hot, warm or cold water may be used for washing, it being understood that hot water is generally to be preferred and that the more water used the more thorough the washing and the more improved the quality of the product.

The acid solutions employed in the first two treatments should be devoid of any added or combined base, it being understood that the presence of such base or bases is detrimental to the best quality of product, in proportion to the quantity of base employed.

In case it is not desired to store the material before complete processing, or if it should be preferred for any other reason, the acid procedure may be performed in a single treatment instead of in two treatments, which single treatment substantially combines the intensity of the two treatments above described. In such case, the acid treatment may be conducted in a closed vessel as explained in connection with the above described second treatment, except that the solution of sulphur dioxide should be of a strength equal to about sixteen to thirty or thirty-five pounds of sulphur dioxide for each one hundred pounds of bone dry fiber in the charge; and the period of time should ordinarily be about six or seven hours, at the stated temperature of less than 110° C., and preferably at approximately 98° C. This procedure is somewhat simpler than the two treatment procedure but it is not feasible where storage of the material for any extended period prior to manufacturing the cellulose therefrom is necessary.

It should be noted that, whether the acid procedure embodies the two treatments or the single treatment, it involves the application of a concentrated acid solution as distinguished from a very dilute solution; but, in either case also, the acid procedure is not calculated to or sufficient to pulp the material but is only adequate to accomplish the purposes hereinabove recited. The use of a concentrated acid solution as distinguished from a dilute acid solution does not serve merely to reduce the time and/or temperature factors required to attain a given result. It has a distinct effect upon the product with respect to the matter of alpha cellulose content. In other words, treatment with a concentrated solution enables the attainment of a very high alpha cellulose which could not be approximated by using a dilute solution and increasing the factors of temperature or time or both. Just why this is so I am not definitely prepared to say but I know it to be a fact by empirical results obtained from many runs. This result is unexpected and unobvious but it is unquestionably a fact.

Following the acid procedure, the material may be given a treatment of an alkaline nature, at below 100° C. and at substantially atmospheric pressure, preferably in a vessel suitably protected from corrosion. For the purpose of this treatment any suitable alkali may be used, depending upon the quality of product desired, although generally it is better to employ an alkali having a sodium base because of its greater ability to dissolve certain substances which it is desired to remove in this treatment as well as because of its own greater solubility compared to such bases as calcium, etc. Where a complete removal of such substances as are better dissolved by sodium is not required, a small amount of such sodium compound may be employed and the remainder may be made up of other alkalies with other bases, such as potassium, magnesium, calcium, etc. Likewise, alkaline liquors, such as sulphate liquors, may be employed in this treatment, or sodium sulphide alone or with sodium hydroxide, or sodium sulphite, or other alkalies, all depending on the cost and the results desired. In general it may be stated that it is desired to employ in this treatment an alkali having a strength equivalent to from two to fourteen percent sodium hydroxide based on the bone dry weight of fiber, either as sodium hydroxide alone or as a mixture of one or more alkalies; or, in other words, equivalent to two to fourteen pounds sodium hydroxide for each one hundred pounds of bone dry fiber.

In cases where an expensive alkali is necessitated by the higher quality of product desired, at least a portion of the chemicals may be recovered by the usual processes of evaporating the used liquors, concentrating and burning to powder containing the larger portion of the base (usually sodium), and regenerating the alkali from such base. Sodium sulphide alone is quite satisfactory for use in this treatment but, owing to the production of sodium hydroxide in the customary recovery processes and difficulties in recovering the sodium base that is combined with certain substances, there naturally is employed a mixture of sodium sulphide and sodium hydroxide when sodium sulphide is used. Practice has demonstrated that, where a high alpha product is required, the use of sodium or potassium hydroxide is indicated.

In preparing this aqueous alkaline solution, it is economical and practical to employ a substantial amount of the weaker so called black liquor derived from the application of the alkaline treatment, hereinafter described, to preceding batches of material; and it is an important advantageous feature of my method that the black liquor derived from the final treatment is so little contaminated by objectionable substances, because of the eliminating action of the previous treatments, that an exceptionally large amount of the said black liquor may be employed in preparing the alkaline solutions. This effects a great economy and is of prime consequence in relation to a profitable commercial operation.

This alkaline solution is preferably added to the fiber by mixing in a vat or the like provided with agitating devices, such as paddles, in order that the fiber may be thoroughly impregnated with the solution. Following such mixing, the material may be pumped or it may flow by gravity, or it may be conveyed, to the next operation where the excess liquid may be removed by pressure and screening apparatus of any well known and approved form, leaving the fiber thoroughly saturated with the alkaline solution. This procedure is of substantial advantage because it eliminates the injection of unnecessary liquid into the vessel designed for the said treatment and thereby increases the amount of fiber included in any given charge of said vessel, and also provides for more even cooking, by properly mixing and distributing the alkali with and through the fiber.

The vessel in which this alkaline treatment is carried out may be provided with temperature controlling appliances or the charge may be directly heated by the injection of steam, and I prefer to carry out this treatment at a temperature which is slightly less than 100° C., and at substantially atmospheric pressure. For the purpose of generating this temperature, waste steam from the final alkaline treatment, or from other sources, may be used in order to promote economy in operation.

With the strength of alkali and temperature above indicated, a treatment for, say, two to six hours is usually sufficient.

As the object and result of this alkali treatment have been hereinbefore explained, it is unnecessary to repeat at this juncture; but I may again call attention to the mild strength of chemical employed and to the low temperature and pressure.

At the end of this alkaline treatment, the excess liquid is removed from the fiber as, for instance, by diluting, screening and pressing apparatus, which excess liquid carries off with it most of the objectionable substances previously stated as being eliminated by this treatment, and the material may then be washed, if desired, to promote whiteness.

The final treatment, as already noted, is of an alkaline nature, but it is conducted at elevated pressure and temperature, though preferably not above 160° C. At the outset of this treatment, the fiber is again mixed with an alkaline solution, preferably of the character above described, so that the fiber may be thoroughly permeated by and impregnated with the alkaline solution. The strength of this solution may vary under different circumstances, but I prefer to use one of about four to eight percent alkali based on the bone dry weight of the fiber. That is to say, four to eight pounds of sodium hydroxide for every one hundred pounds of bone dry fiber. The thorough impregnation of the fibrous material by the alkali in connection with this alkaline treatment is of even more importance than in connection with the previous treatment because, among other reasons, it is of more economic value fully to charge the digesters used in the high pressure treatment than the vats used in the low pressure treatment, and also because the complete saturation of the fiber with the alkaline solution protects it against injury upon the application of heat for generating the high temperature employed, which heat might tend seriously to injure any part of the fiber that had not been reached by the alkali. Again, this thorough mixing insures uniform distribution of the chemical which entails uniform action.

Following this thorough mixing of the fiber and alkaline solution, the excess liquid may be removed, as by screening and pressing apparatus, and the material is then passed into the vessel for conducting the treatment at elevated pressure and temperature. The amount of liquid carried along with the fiber is adequate for this purpose, because sugar cane fiber will absorb, without dripping, several times its weight of liquid. The vessel employed for this purpose is preferably of the digester type, but it should be protected, in any well known or approved manner, against the chemical action involved. The arrangement of valves, vents, and the like, may differ to a certain extent from the standard arrangement of the sulphite digesters, but such changes are well within the skill of the calling and merely for the purpose of better adapting the apparatus to the specific conditions in hand. It should be stated, however, that the said fittings should be protected against the chemical action of the treatment.

After the charge has been passed into this vessel, the valves, vents, and the like, are closed, and the same is heated indirectly or directly by steam until a temperature of approximately 140° C.–160° C. has been reached and a corresponding pressure generated. The charge is then maintained at substantially this temperature and pressure for about four to six or more hours, which period of time may, of course, be varied in compliance with different circumstances.

After this period has expired, the fibrous material may be removed from the digester, as by blowing into a pit or other container, and thereafter washed in a suitable manner with water, bleached and otherwise finally treated, all as is well understood in this art. It may be said that, for certain purposes, the bleaching may be eliminated because the unbleached product is very light in color, but, if an absolutely pure white product is desired, there should be some bleaching. The cellulose product will be found to have all the high qualities hereinbefore recited. Where sulphate liquor is used in the alkaline steps the product will have more nearly the strength of kraft and yet will be white, so that I have termed such product white kraft.

It should be pointed out as a characteristic of this procedure that no one of the treatments described is, of itself, adequate to produce a fully pulped fiber. True, the final treatment accomplishes this pulping, but that is because of the effect of the preceding treatments which have so acted upon the fibrous material as to render it susceptible to pulping by the final alkaline treatment, which treatment is of such a mild nature that it would not, of itself, pulp the fibrous material if it had not been subject to the earlier treatments of the method.

If desired, the alkaline procedure may be conducted in one treatment instead of two, in which case I prefer to use a solution having a strength equivalent to twelve to twenty-five or more pounds of sodium hydroxide per one hundred pounds of bone dry fiber; to use a temperature of 140° C. to 160° C.; and to conduct the treatment for a period of four to six hours or more. The temperature may be less than 140° C. if the period of time is appropriately extended. This single alkaline treatment is naturally simpler than the double treatment, but the latter is preferred when a product of very high alpha content is demanded.

Although I have described above the separation of the long fibers and their treatment, the method is also applicable to the treatment of the whole of the fiber without such separation and, further, the separation may take place and the short fibers be treated instead of the long.

Again, while I have described the treatment of sugar cane fiber resulting from cane which has been put through the usual processes for extracting the sugar, it is an advantage of this invention that I may utilize fiber obtained from sugar cane which has been damaged with respect to its adaptibility for the manufacture of sugar as, for instance, by fires in the field. Such damaged sugar cane, even though it may be unsuitable for the production of sugar, includes fibrous material which is well adapted for treatment by my above described method whereby the uninjured fibers can be separated and the intended product obtained. Furthermore, as above indicated, this method is adapted to the treatment of other vegetable substances containing cellulose fibers so that when, in the claims, I refer to vegetable fiber, I intend to cover the treatment of such fiber in any form or condition suitable to the application of my method. Finally, when I refer to acid and alkali, I intend to cover not only those specifically named, but also others having a similar effect in my method, though for acid I prefer a solution of sulphur dioxide and water without any added or combined base, and for alkali I prefer sodium or potassium hydroxide.

In the foregoing I have referred to apparatus in general terms without herein presenting any claims to apparatus, and I should say that this failure further to describe and claim any such apparatus is not to be regarded as a dedication of the same.

In connection with the alkaline treatment I have suggested the premixing of the chemical with the fiber and the removal of the excess chemical before initiating the treatments, and have pointed out certain advantages that reside in this procedure. It may here be added that the said premixing and removal of excess chemical may also be advantageously adopted in connection with the acid treatment, where the strength of acid used and temperature are low.

It will be understood that various changes may be resorted to in the steps of the method, in the materials and in the apparatus, without departing from the spirit and scope of my invention; and hence I do not intend to be limited to the details herein set forth, except as they may be included in the claims.

What I claim is:

1. A method of treating vegetable fiber to produce cellulose of very high alpha content, low ash content and exceptional quality, which includes, treating the fiber with a concentrated solution of sulphur dioxide and water containing at least twelve pounds of sulphur dioxide for each one hundred pounds of bone dry fiber and, subsequently, treating the fiber with alkali.

2. A method of treating vegetable fiber to produce cellulose of very high alpha content, low ash content and exceptional quality, which includes, treating the fiber with a concentrated solution of sulphur dioxide and water containing at least twelve pounds of sulphur dioxide for each one hundred pounds of bone dry fiber, washing the fiber and, subsequently, treating the fiber with alkali.

3. A method of treating vegetable fiber to produce cellulose of very high alpha content, low ash content and exceptional quality, which includes, treating the fiber with a solution of sulphur dioxide and water, storing the fiber, again treating the fiber with a solution of sulphur dioxide and water and, subsequently, treating the fiber with an alkaline solution.

4. A method of treating vegetable fiber to produce cellulose of very high alpha content, low ash content and exceptional quality, which includes, treating the fiber with a solution of sulphur dioxide and water, storing the fiber, again treating the fiber with a solution of sulphur dioxide and water and, subsequently, treating the fiber with a plurality of alkaline solutions.

5. A method of treating vegetable fiber to produce cellulose of very high alpha content, low ash content and exceptional quality, which includes, treating the fiber with a solution of sulphur dioxide and water, storing the fiber, again treating the fiber with a solution of sulphur dioxide and water and, subsequently, treating the fiber with a plurality of alkaline solutions, said acid treatments being of increasing intensity and said alkaline treatments being of increasing intensity.

6. A method of treating vegetable fiber to produce cellulose of very high alpha content, low ash content and exceptional quality, which includes, treating the fiber with a solution of sulphur dioxide and water, storing the fiber, again treating the fiber with a solution of sulphur dioxide and water and, subsequently, treating the fiber with a plurality of alkaline solutions, said acid treatments being conducted at temperatures below 110° C., an alkaline treatment being conducted at substantially atmospheric pressure and at temperature below boiling, and another alkaline treatment being conducted at pressure above atmosphere and temperature above boiling.

JOAQUIN JULIO DE LA ROZA, Sr.